(12) United States Patent
Ikemoto et al.

(10) Patent No.: US 11,322,947 B2
(45) Date of Patent: May 3, 2022

(54) ENERGY STORAGE APPARATUS

(71) Applicant: GS Yuasa International Ltd., Kyoto (JP)

(72) Inventors: Jun Ikemoto, Kyoto (JP); Hayato Tawa, Kyoto (JP); Kazuyuki Kawamoto, Kyoto (JP); Daisuke Konishi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 159 days.

(21) Appl. No.: 16/753,254

(22) PCT Filed: Sep. 13, 2018

(86) PCT No.: PCT/JP2018/033957
§ 371 (c)(1),
(2) Date: Apr. 2, 2020

(87) PCT Pub. No.: WO2019/069652
PCT Pub. Date: Apr. 11, 2019

(65) Prior Publication Data
US 2020/0335985 A1  Oct. 22, 2020

(30) Foreign Application Priority Data

Oct. 4, 2017  (JP) .............................. JP2017-194235

(51) Int. Cl.
*H02J 7/00* (2006.01)
*H01M 10/42* (2006.01)
(Continued)

(52) U.S. Cl.
CPC ......... *H02J 7/0014* (2013.01); *H01M 10/425* (2013.01); *H01M 10/441* (2013.01);
(Continued)

(58) Field of Classification Search
USPC ........................................................ 320/117
See application file for complete search history.

(56) References Cited

U.S. PATENT DOCUMENTS 9,620,969 B2    4/2017  Kobayashi et al.
10,439,414 B2 * 10/2019  Oughton, Jr. ......... H02M 3/155
(Continued)

FOREIGN PATENT DOCUMENTS

JP    11-332118 A    11/1999
JP    2013-005678 A   1/2013
(Continued)

OTHER PUBLICATIONS

International Searching Authority, International Search Report (ISR) and Written Opinion for International Application No. PCT/JP2018/033957, 8 pages, Japan Patent Office, Japan.

*Primary Examiner* — Mohammed Alam
(74) *Attorney, Agent, or Firm* — Alston & Bird LLP

(57) ABSTRACT

A power storage device 20 comprises: a plurality of power storage elements C1-C6 that are connected in series; energy transfer circuits 40 provided respectively to the plurality of power storage elements C1-C6; a common bus 50 to which the energy transfer circuits 40 of the plurality of power storage elements C1-C6 are commonly connected; and a control device 70. Each energy transfer circuit 40 includes one or a plurality of switching transformers Tr, each switching transformer having a first winding 41A that is connected to the power storage elements C1-C6 and a secondary winding 41B that is connected to the common bus 50. The control device 70 uses the switching transformers Tr of the energy transfer circuits 40 to transfer energy between the power storage elements via the common bus 50, thereby equalizing the voltages of the power storage elements C1-C6. The common bus 50 is in an electrically floating state.

11 Claims, 18 Drawing Sheets

(51) Int. Cl.
*H01M 10/44* (2006.01)
*H01M 10/48* (2006.01)
*H02M 3/335* (2006.01)

(52) U.S. Cl.
CPC ......... *H01M 10/482* (2013.01); *H02J 7/0047* (2013.01); *H01M 2010/4271* (2013.01); *H02J 2207/20* (2020.01); *H02M 3/33523* (2013.01)

(56) References Cited

U.S. PATENT DOCUMENTS

| | | |
|---|---|---|
| 2010/0134069 A1 | 6/2010 | Oosawa et al. |
| 2013/0234669 A1* | 9/2013 | Huang .................. H02J 7/0029 320/126 |
| 2014/0159650 A1 | 6/2014 | Beauregard |
| 2017/0271889 A1 | 9/2017 | Sugeno et al. |
| 2018/0019600 A1 | 1/2018 | Miyazaki et al. |
| 2018/0275699 A1* | 9/2018 | Oughton .................. H02M 1/14 |
| 2018/0278074 A1* | 9/2018 | Oughton, Jr. ....... H02M 7/4833 |
| 2020/0335985 A1* | 10/2020 | Ikemoto ................ H02J 7/0018 |

FOREIGN PATENT DOCUMENTS

| | | |
|---|---|---|
| JP | 5349021 B2 | 8/2013 |
| JP | 2014-521301 A | 8/2014 |
| JP | 2016-073066 A | 5/2016 |
| WO | WO 2014/115200 A1 | 7/2014 |
| WO | WO 2016/158031 A1 | 10/2016 |

* cited by examiner

ENERGY STORAGE APPARATUS

CROSS REFERENCE TO RELATED APPLICATIONS

This application is a national stage application, filed under 35 U.S.C. § 371, of International Application No. PCT/JP2018/033957, filed Sep. 13, 2018, which claims priority to Japan Application No. 2017-194235, filed Oct. 4, 2017, the contents of both of which as are hereby incorporated by reference in their entirety.

BACKGROUND

Technical Field

The present invention relates to a technology for equalizing the voltages of energy storage devices.

Description of Related Art

The energy storage devices have variations in the amount of self-discharge and internal resistance. Therefore, an energy storage apparatus in which the energy storage devices are connected in series has a balancer function for equalizing the voltages of the energy storage devices.

Patent No. 5349021 discloses a resistance discharge type balancer circuit. The resistance discharge type balancer circuit equalizes the voltages of the energy storage devices by discharging the high-voltage energy storage device to reduce the voltage. Therefore, an energy storage apparatus having a large capacity generates a large amount of heat. Further, since the amount of discharge is also large, there is a problem that energy efficiency is poor.

Patent No. JP-T-2014-521301 discloses a method for equalizing voltages by transferring energy between cells via a grounded common bus. This method has an advantage that energy efficiency is higher than that of the resistance discharge type.

BRIEF SUMMARY

In the above configuration, since the common bus is grounded, there is a concern about risks such as electric shock and electric leakage.

The present invention has been completed based on the above circumstances, and an object of the present invention is to improve the safety of an energy storage apparatus having a voltage equalizing function.

An energy storage apparatus, includes: a plurality of energy storage devices connected in series; an energy transfer circuit provided for each of the plurality of energy storage devices; a common bus in which the energy transfer circuits of the plurality of energy storage devices are connected in common; and a control device, in which the energy transfer circuit includes one or more switching transformers each having a first winding connected to the energy storage device and a second winding connected to the common bus, the control device equalizes voltages of the energy storage devices by transferring energy between the energy storage devices via the common bus by using the energy transfer circuits, and the common bus is electrically floating.

In this configuration, the voltages of the energy storage devices are equalized by transferring energy between the energy storage devices via the common bus by using the energy transfer circuits. Moreover, the common bus is electrically floating. Therefore, the risk of electric shock and electric leakage is small. In the case of floating, the safety is higher because the voltage is lower than in the case where the common bus is connected to both electrodes of the energy storage devices connected in series.

DETAILED DESCRIPTION OF VARIOUS EMBODIMENTS

Figure 1:
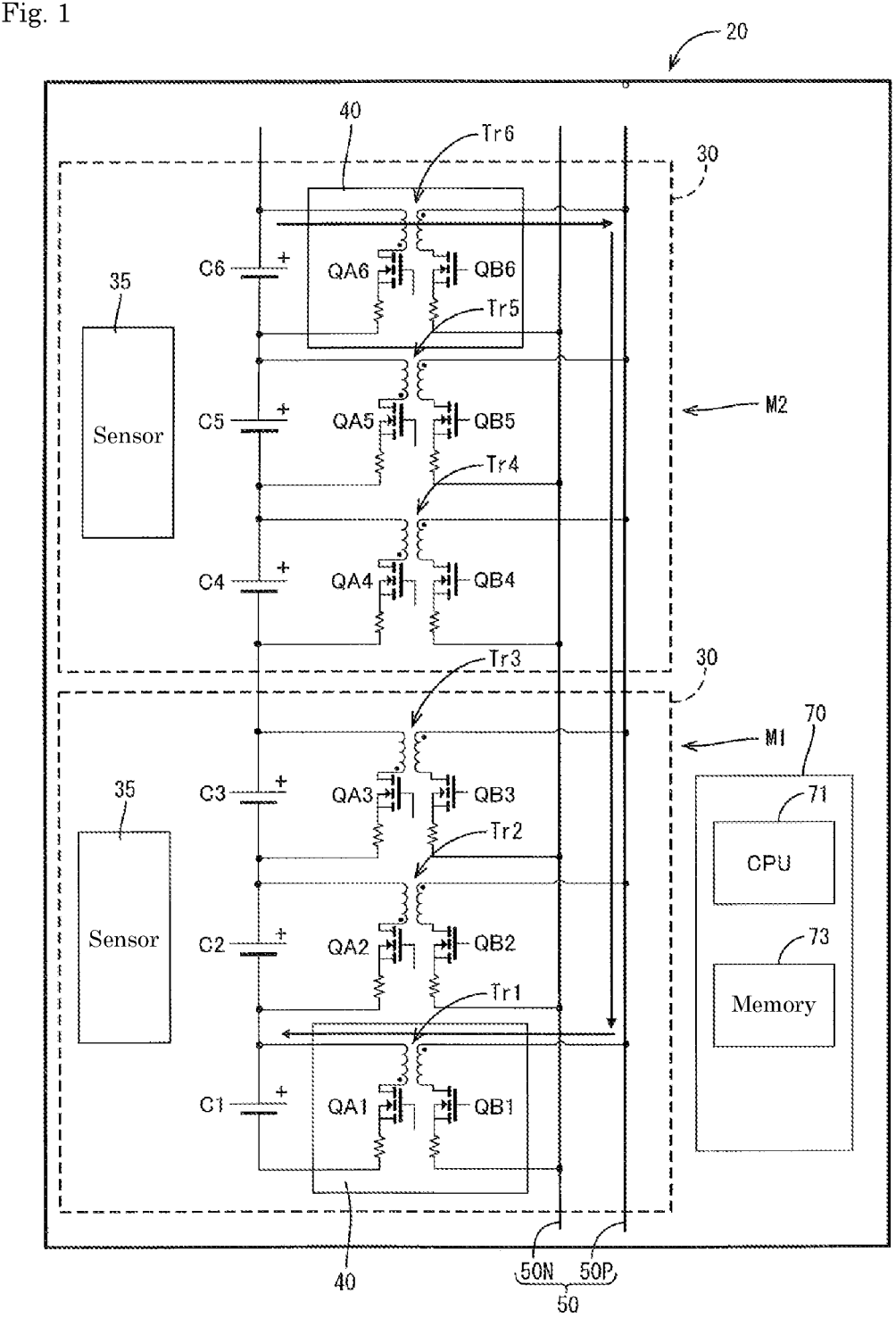
FIG. 1 is a circuit diagram showing an electric configuration of a battery according to a first embodiment.

An energy storage apparatus, includes: a plurality of energy storage devices connected in series; an energy transfer circuit provided for each of the plurality of energy storage devices; a common bus in which the energy transfer circuits of the plurality of energy storage devices are connected in common; and a control device, in which the energy transfer circuit includes one or more switching transformers each having a first winding connected to the energy storage device and a second winding connected to the common bus, the control device equalizes voltages of the energy storage devices by transferring energy between the energy storage devices via the common bus by using the energy transfer circuits, and the common bus is electrically floating.

In this configuration, the voltages of the energy storage devices are equalized by transferring energy between the energy storage devices via the common bus by using the energy transfer circuits. Moreover, the common bus is electrically floating. Therefore, the risk of electric shock and electric leakage is small. In addition, in the case of floating, the voltage is lower, and the safety is higher than in the case where the common bus is connected to both electrodes of the energy storage devices connected in series.

A plurality of energy storage device modules connected in series or in parallel are provided, in which each of the energy storage device modules includes the plurality of energy storage devices connected in series, the energy transfer circuits provided in the respective energy storage devices of the energy storage device modules connected in series or in parallel are connected to the common bus, respectively, and the control device may equalize voltages of the energy storage devices between the energy storage device modules by transferring energy between the energy storage device modules via the common bus by using the transformers of the energy transfer circuits. The energy storage device module is a module in which a plurality of energy storage devices are housed in a housing such as a case and can be handled as one component. With this configuration, the voltages can be equalized not only within the same energy storage device module but also between different energy storage device modules. It is possible to simultaneously equalize voltages between modules in which a plurality of cell modules are connected in series and equalize voltages between cells. Therefore, the energy of the maximum capacity can be used as the whole system including a plurality of battery modules. In addition, since the common bus has a low voltage, it is possible to safely perform connection work and removal work of the energy storage device module, and it is possible to safely and easily perform addition work and replacement work of the energy storage device module.

The energy transfer circuit may include the switching transformer, a first switch provided on the first winding of the switching transformer, and a second switch provided on the second winding of the switching transformer. With this configuration, energy can be transferred bidirectionally from the energy storage device to the common bus and from the common bus to the energy storage device with only one switching transformer. Therefore, the number of components can be reduced. The amount of power to be moved can be adjusted by switching control, and voltage equalization between cell modules and voltage equalization between cells can be performed in the optimal time.

The control device, in a case where it compares voltages of the plurality of energy storage devices with an allowable range of voltage variation, and there are a plurality of energy storage devices each having a voltage higher than the allowable range, may allow an energy storage device having a higher voltage to transfer a larger amount of energy to the common bus than an energy storage device having a lower voltage, among the plurality of energy storage devices each having a voltage higher than the allowable range. In this configuration, when there are a plurality of energy storage devices having a voltage higher than the allowable range, the amount of energy to be transferred to the common bus is controlled to be larger from the high-voltage energy storage device than from the low-voltage energy storage device. Therefore, it is possible to reduce the voltage difference between the plurality of energy storage devices each having a voltage higher than the allowable range while reducing the voltages of these energy storage devices.

The control device, in a case where it compares voltages of the plurality of energy storage devices with an allowable range of voltage variation, and there are a plurality of energy storage devices each having a voltage lower than the allowable range, may allow an energy storage device having a lower voltage to receive a larger amount of energy from the common bus than an energy storage device having a higher voltage, among the plurality of energy storage devices each having a voltage lower than the allowable range. In this configuration, when there are a plurality of energy storage devices each having a lower voltage than the allowable range, the amount of energy received from the common bus is controlled to be larger in the low-voltage energy storage device than in the high-voltage energy storage device. Therefore, it is possible to reduce the voltage difference between the plurality of energy storage devices each having a voltage lower than the allowable range while increasing the voltages of these energy storage devices.

The control device adjusts an amount of energy transferred from the energy storage device to the common bus or an amount of energy received by the energy storage device from the common bus by changing an energy transfer cycle of the energy transfer circuit. With this configuration, the amount of energy transferred to or received from the common bus can be adjusted by software processing by the control device.

First Embodiment

1. Description of battery

FIG. 1 is a block diagram showing an electrical configuration of the battery. A battery 20 is used, for example, for a large moving object such as a ship. The battery 20 has a plurality of battery modules M, a common bus 50, and a control device 70. The battery 20 is an example of the "energy storage apparatus" of the present invention, and the battery module M is an example of the "energy storage device module" of the present invention.

The battery module M includes a plurality of secondary batteries C connected in series, a module sensor 35, an energy transfer circuit 40, and a metal case 30 that houses these. The battery module M is a module that houses a plurality of secondary batteries C in a housing such as a case and can be handled as one component.

The battery module M has external terminals (not shown) and can be connected in series or in parallel. The battery 20 shown in FIG. 1 has two battery modules M1 and M2 connected in series.

The secondary battery C is, for example, a lithium ion secondary battery, and each battery module M1, M2 has a configuration in which three secondary batteries C are connected in series. Therefore, the entire battery modules M1 and M2 have a configuration in which six secondary batteries C1 to C6 are connected in series.

The module sensor 35 is provided for each of the battery modules M1 and M2. The module sensor 35 detects the voltage of each secondary battery C constituting the battery module M, the total voltage Vm of the battery module M, and the temperature of the battery module M.

Therefore, in the case of the module sensor 35 of the battery module M1, the voltages Vc1 to Vc3 of the respective secondary batteries C1 to C3, the total voltage Vm of the battery module M1, and the temperature of the battery module M1 are detected.

$$Vm=Vc1+Vc2+Vc3$$

Figure 2:
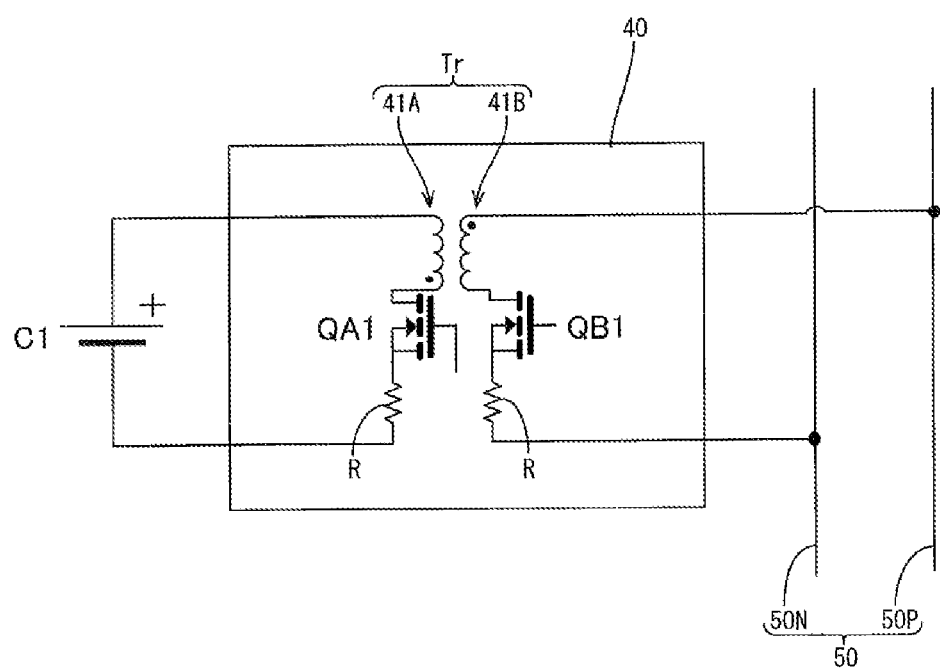
FIG. 2 is an enlarged view of an energy transfer circuit.

The energy transfer circuit 40 is provided for each of the secondary batteries C1 to C6. FIG. 2 is an enlarged view of the energy transfer circuit 40 provided corresponding to the secondary battery C1.

As shown in FIG. 2, the energy transfer circuit 40 is a flyback type bidirectional transfer circuit, and includes a switching transformer Tr, a first semiconductor switch QA, and a second semiconductor switch QB. The first semiconductor switch QA is an example of the "first switch" of the present invention, and the second semiconductor switch QB is an example of the "second switch" of the present invention. Bidirectional means that both energy transfer from the secondary battery C side to the common bus 50 and energy transfer from the common bus 50 to the secondary battery C side can be performed by a single switching transformer Tr.

The switching transformer Tr has a first winding 41A and a second winding 41B. The first winding 41A and the second winding 41B are insulated. One end of the first winding 41A is connected to the positive electrode of the secondary battery C1. The other end of the first winding 41A is connected to the negative electrode of the secondary battery C1 via the first semiconductor switch QA and a resistor R. The first semiconductor switch QA is an N-channel field-effect transistor, and can be turned on and off by giving a control signal to a gate.

Further, one end of the second winding 41B of the switching transformer Tr is connected to a positive bus bar 50P constituting the common bus 50. The other end of the second winding 41B is connected to a negative bus bar 50N constituting the common bus 50 via the second semiconductor switch QB and a resistor R. The second semiconductor switch QB is an N-channel field-effect transistor, and can be turned on and off by giving a control signal to a gate.

The switching transformer Tr is a transformer that stores magnetic energy by using a switching operation and discharges the stored magnetic energy as electric energy.

The common bus 50 includes a positive bus bar 50P and a negative bus bar 50N. As shown in FIG. 1, the common bus 50 is provided penetrating through the case 30 of each of the battery modules M1 and M2. The common bus 50 is insulated from the case 30. The common bus 50 is commonly connected to the respective second windings 41B of the switching transformers Tr provided corresponding to the secondary batteries C1 to C6 of the battery modules M1 and M2. The common bus 50, on both the positive electrode side and the negative electrode side, is only connected to each of the commonly connected second windings 41B, is not connected anywhere else including a power supply line (+), a ground line (−), and secondary batteries C1 to C6, and is electrically floating.

The control device 70 includes a CPU 71 having an arithmetic function, a memory 73 storing various information, and the like. The memory 73 stores data necessary for executing equalization processing described later.

The control device 70 monitors the total voltage Vm and temperature of each of the battery modules M1 and M2, and the voltages Vc1 to Vc6 of the respective secondary batteries C1 to C6, based on the outputs from the module sensors 35 of the battery modules M1 and M2. Further, the control device 70 performs voltage equalization control described below.

2. Voltage monitoring and equalization processing

Figure 3:
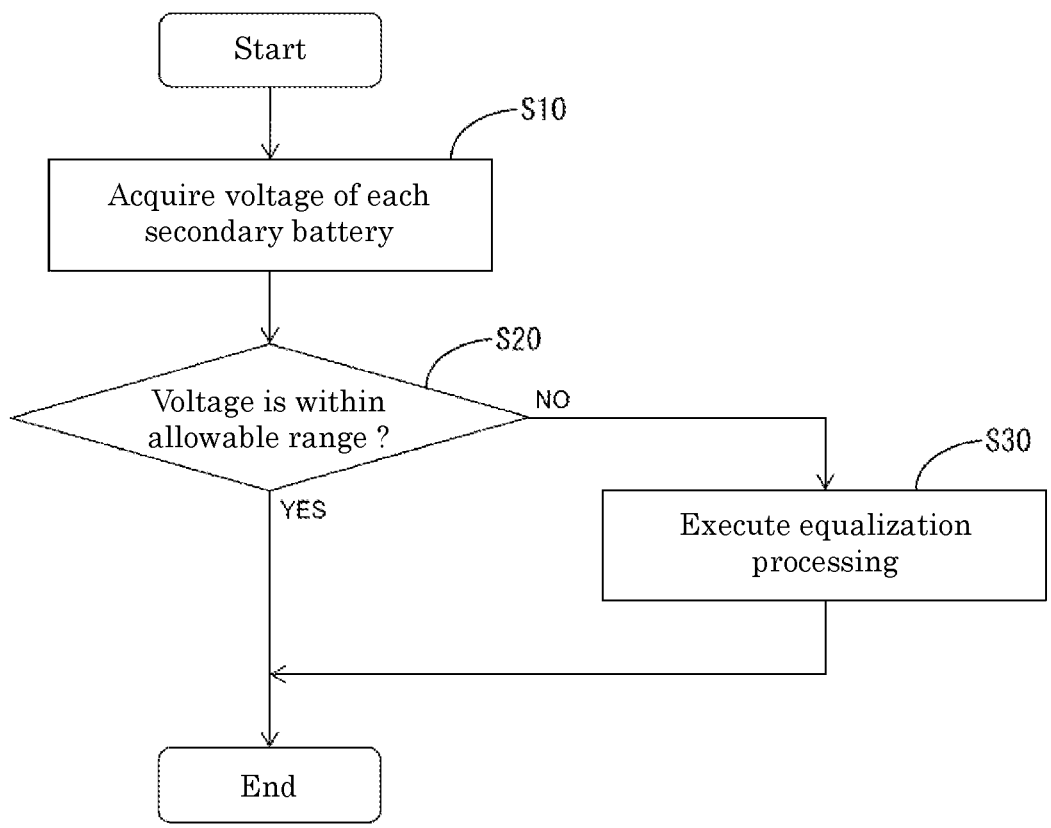
FIG. 3 is a flowchart of voltage monitoring and equalization processing.

FIG. 3 is a flowchart of the voltage monitoring and equalization processing. The voltage monitoring and equalization processing is executed by the control device 70, and includes three steps S10 to S30.

First, in S10, the control device 70 acquires the voltages Vc1 to Vc6 of the respective secondary batteries C1 to C6 based on the outputs from the module sensors 35 provided in the battery modules M1 and M2.

Next, in S20, the control device 70 determines whether or not the voltages Vc1 to Vc6 of the respective secondary batteries C1 to C6 are within the allowable range Y of the voltage variation.

Figure 4:
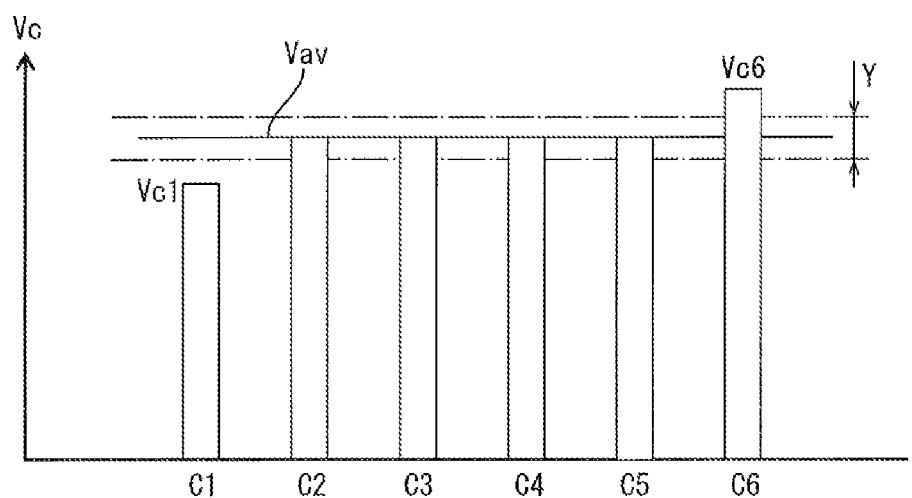
FIG. 4 is a diagram showing a variation in voltage of a secondary battery.

Specifically, as shown in FIG. 4, the control device 70 calculates an average value Vav of voltages Vc1 to Vc6 of the secondary batteries C1 to C6. Next, based on the average value Vav, the allowable range Y of the voltage variation is obtained, and it is determined whether or not the voltages Vc1 to Vc6 of the secondary batteries C1 to C6 are included in the allowable range Y.

When the voltages of the secondary batteries C1 to C6 are all included in the allowable range Y (S20: YES), the process ends.

On the other hand, in a case where even the voltage of one of the secondary batteries C1 to C6 is out of the allowable range Y (S20: NO), the control device 70 executes the equalization processing for equalizing the voltages (S30).

The equalization processing, as described in detail below, uses the energy transfer circuit 40 to transfer energy (charge) from a high-voltage secondary battery C to a low-voltage lithium secondary battery C via the common bus 50, thereby reducing the variation of the voltages Vc among the secondary batteries to equalize the voltages Vc.

The voltage monitoring and equalization processing shown in FIG. 3 is repeatedly executed at a predetermined cycle after the control device 70 is started. Therefore, when the voltages of the secondary batteries C1 to C6 deviate from the allowable range Y, the equalization processing is thereafter performed, and thus it is possible to always maintain each of the secondary batteries C1 to C6 constituting the battery modules M1 to M2 in a state where the variation of the voltages Vc is small.

3. Specific Example of Equalization Processing (1) A case where there is one secondary battery C6 having a voltage higher than the allowable range Y and one secondary battery C1 having a lower voltage (in the case of FIG. 4)

Figure 5:
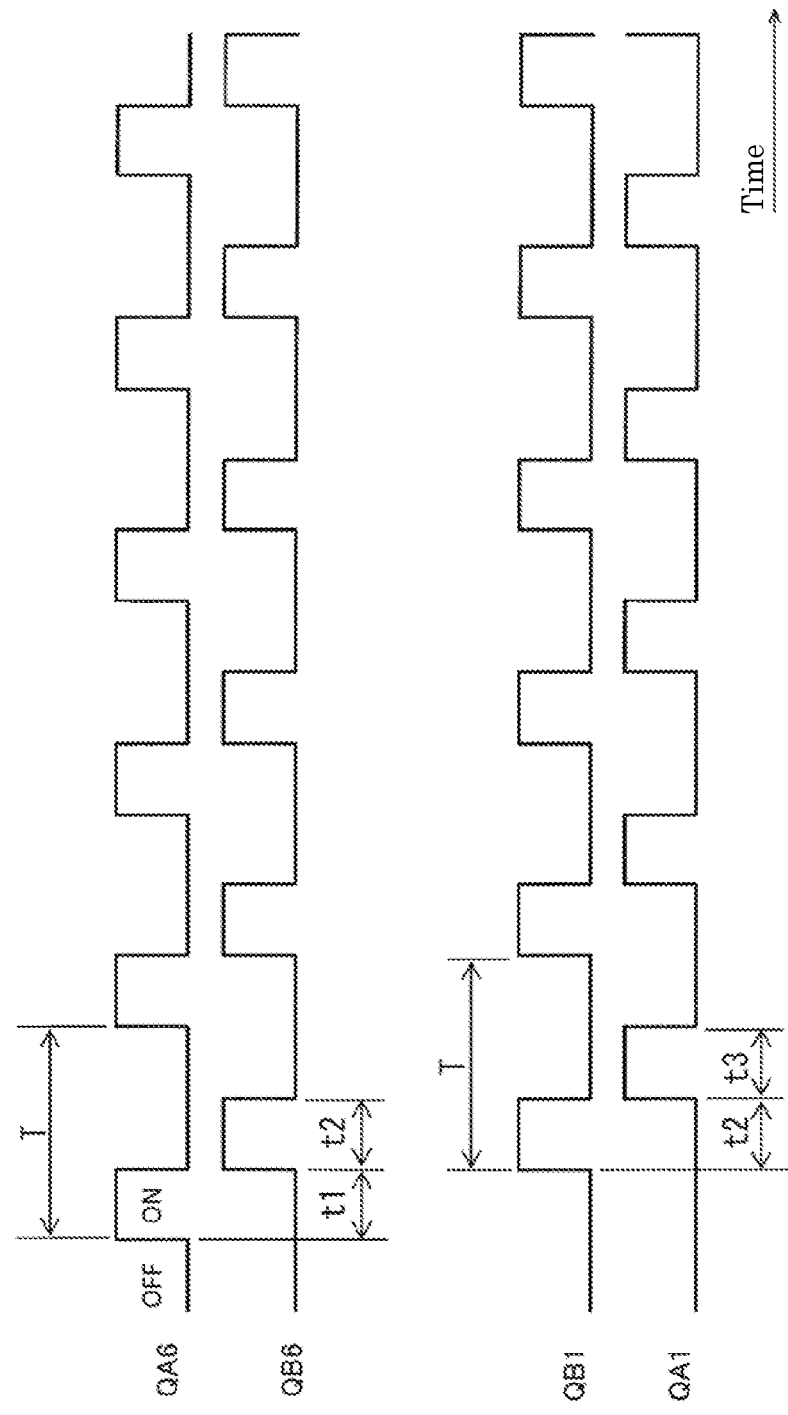
FIG. 5 is a timing chart showing ON/OFF of a semiconductor switch.

In this case, as shown in FIG. 5, the control device 70 gives an operation signal to a first semiconductor switch QA6 of a switching transformer Tr6 corresponding to the high-voltage secondary battery C6 to turn on the first semiconductor switch QA6. Note that a second semiconductor switch QB6 is controlled to be turned off while the first semiconductor switch QA6 is turned on.

When the first semiconductor switch QA6 is turned on, a current flows from the secondary battery C6 to the first winding 41A of the switching transformer Tr6, and magnetic energy is stored in the switching transformer Tr6 (period t1).

Next, the control device 70 turns off the first semiconductor switch QA6 of the switching transformer Tr6, and gives an operation signal to the second semiconductor switch QB6 to turn on the second semiconductor switch QB6 (period t2).

When the first semiconductor switch QA6 is turned off and the second semiconductor switch QB6 is turned on, a current flows from the second winding 41B to the common bus 50 by the back electromotive force of the switching transformer Tr6. That is, the switching transformer Tr6 discharges the stored magnetic energy as electric energy. Thereby, the energy stored in the switching transformer Tr6 can be transferred to the common bus 50.

Further, during the ON operation of the second semiconductor switch QB6 (period t2), the control device 70 turns on the second semiconductor switch QB1 of the switching transformer Tr1 corresponding to the low-voltage secondary battery C1.

As a result, a current flows from the common bus 50 to the second winding 41B of the switching transformer Tr1. Therefore, the energy transferred from the switching transformer Tr6 to the common bus 50 is stored as magnetic energy from the common bus 50 to the switching transformer Tr1.

Next, the control device 70 turns off the second semiconductor switch QB1 of the switching transformer Tr1 and gives an operation signal to the first semiconductor switch QA1 of the switching transformer Tr1 to turn on the first semiconductor switch QA1 (period t3).

When the second semiconductor switch QB1 is turned off and the first semiconductor switch QA1 is turned on, a current flows from the first winding 41A of the switching transformer Tr1 to the secondary battery C1 due to the back electromotive force of the switching transformer Tr1. That is, the switching transformer Tr1 discharges the stored magnetic energy as electric energy. Thus, the energy stored in the switching transformer Tr1 can be transferred to the low-voltage secondary battery C1.

As described above, energy (charge) can be transferred from the high-voltage secondary battery C6 to the low-voltage secondary battery C1. The control device 70 executes such a switching operation at a predetermined cycle T, so that the voltage of the high-voltage lithium secondary battery C6 decreases and the voltage of the low-voltage secondary battery C1 increases, and thus the voltages of the secondary batteries C1 to C6 can be equalized.

The control device 70 monitors the voltages of the secondary batteries C1 and C6 from the outputs of the module sensors 35 after the start of the execution of the equalization processing, continues at least the switching operation of the semiconductor switches QA and QB while the secondary batteries C1 and C6 are out of the allowable range Y, ends the switching operation when the voltages of the secondary batteries C1 and C6 to be voltage-adjusted substantially reach the average value Vav, and completes the equalization processing.

Figure 6:
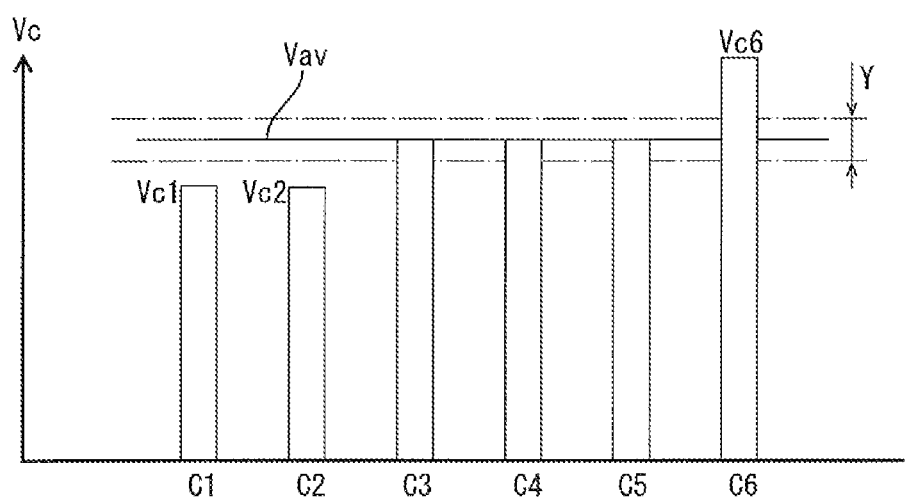
FIG. 6 is a view showing a variation in voltage of a secondary battery.

(2) A case where there is one secondary battery C6 having a voltage higher than the allowable range Y, there are a plurality of secondary batteries C1 and C2 each having a lower voltage, and there is no voltage difference between the low-voltage secondary batteries C1 and C25 (in the case of FIG. 6, Vc1≈Vc2)

Figure 7:
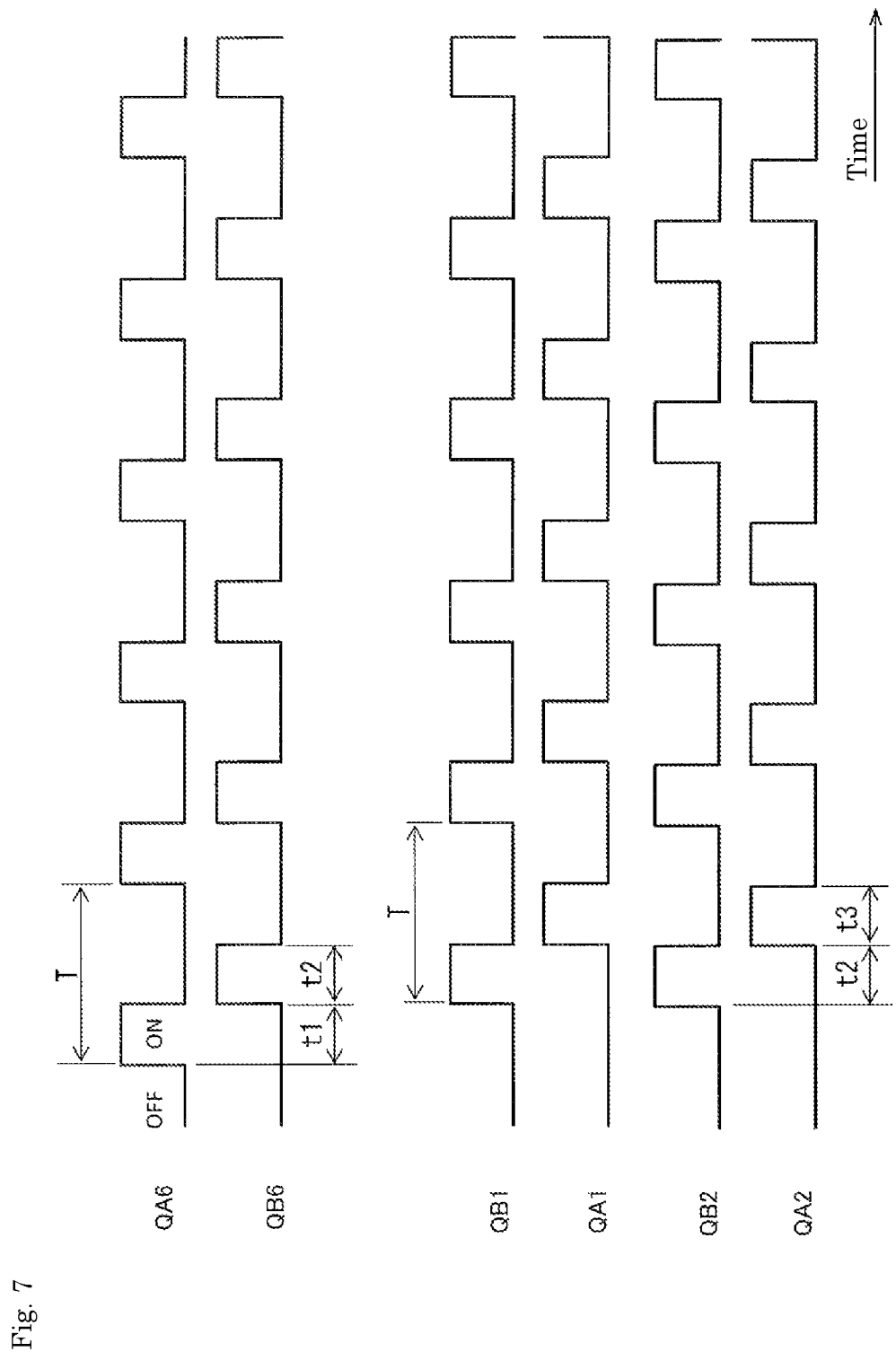
FIG. 7 is a timing chart showing ON/OFF of a semiconductor switch.

In this case, as shown in FIG. 7, similarly to the case of (1), the control device 70 turns on the first semiconductor switch QA6 of the switching transformer Tr6 during the period t1, and turns on the second semiconductor switch QB6 during the period t2.

Figure 8:
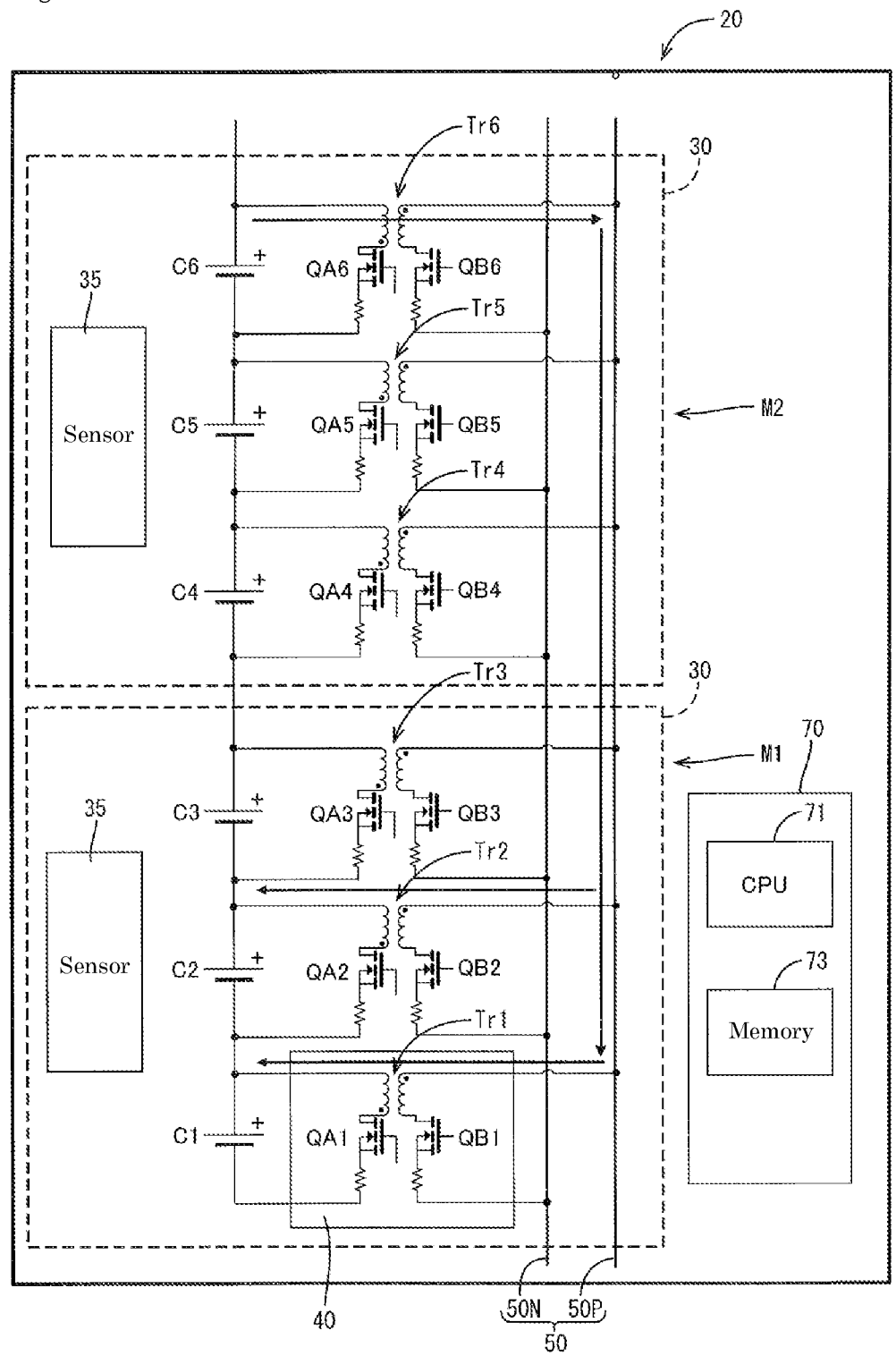
FIG. 8 is a diagram showing an energy transfer operation.

Thereby, as shown in FIG. 8, energy can be transferred from the high-voltage secondary battery C6 to the common bus 50 via the switching transformer Tr6.

The control device 70 simultaneously turns on the second semiconductor switch QB1 of the switching transformer Tr1 and the second semiconductor switch QB2 of the switching transformer Tr2 during the period t2, and simultaneously turns on the first semiconductor switch QA1 of the switching transformer Tr1 and the first semiconductor switch QA2 of the switching transformer Tr2 during the period t3.

Thus, as shown in FIG. 8, energy can be transferred from the common bus 50 to the two low-voltage secondary batteries C1 and C2 via the switching transformers Tr1 and Tr2.

By doing so, the voltage of the high-voltage lithium secondary battery C6 decreases, and the voltages of the low-voltage secondary batteries C1 and C2 increase, so that the voltages of the secondary batteries C1 to C6 can be equalized. In this method, since energy is simultaneously transferred from the common bus 50 to the plurality of low-voltage secondary batteries C1 and C2, there is an advantage that the time required for equalization is short.

Figure 9:
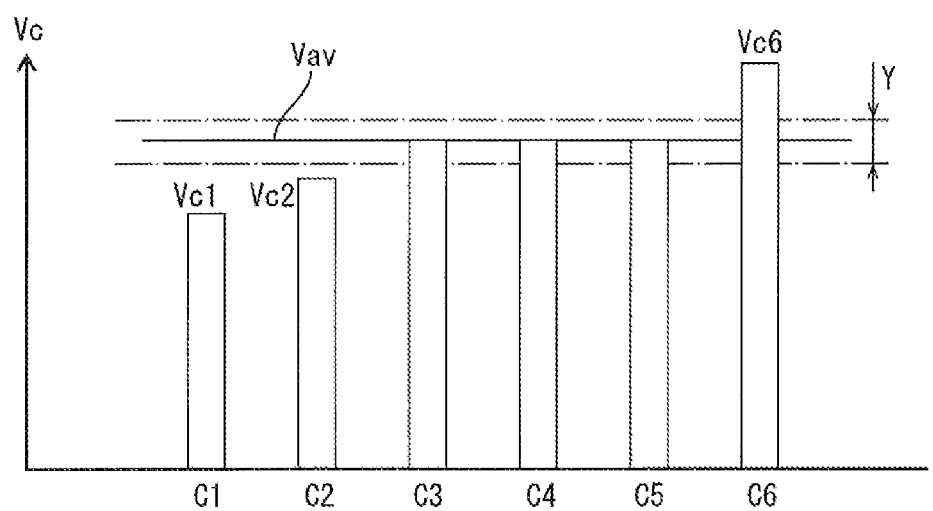
FIG. 9 is a diagram showing a variation in voltage of a secondary battery.

(3) A case where there is one secondary battery C6 having a voltage higher than the allowable range Y, there are a plurality of low-voltage secondary batteries C1 and C2, and there is a voltage difference between the low-voltage secondary batteries C1 and C2 (in the case of FIG. 9, (Vc1<Vc2)

Figure 10:
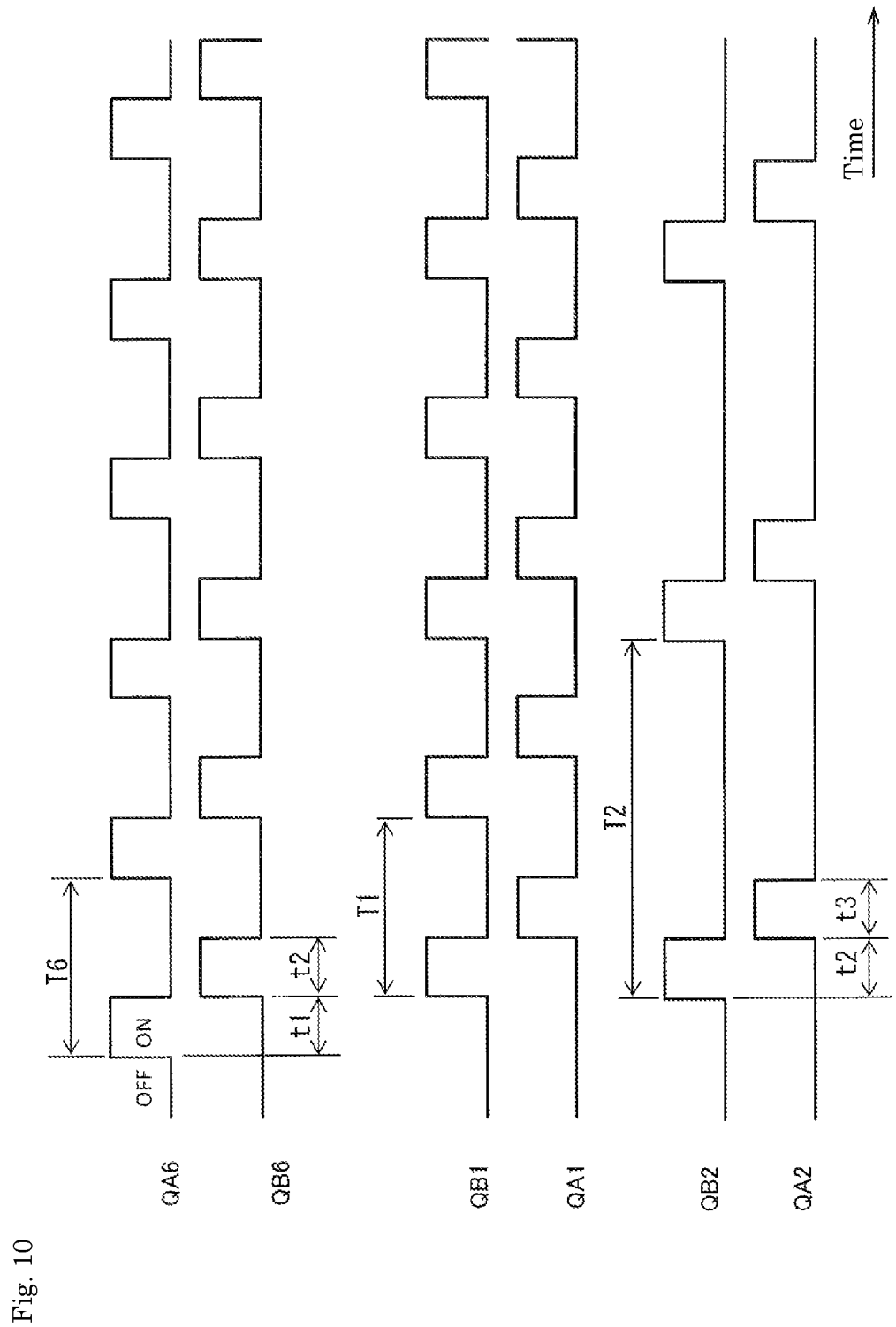
FIG. 10 is a timing chart showing ON/OFF of a semiconductor switch.

In this case, as shown in FIG. 10, the control device 70 changes the switching operation cycle T of the semiconductor switches QA and QB of the switching transformers Tr1 and Tr2 according to the voltage difference between the secondary batteries C1 and C2.

Specifically, of the two secondary batteries C1 and C2 each having a voltage lower than the allowable range Y, a switching operation cycle T1 of the semiconductor switches QA and QB of the switching transformer Tr1 corresponding to the secondary battery C1 having a lower voltage is made shorter than a switching operation cycle T2 of the semiconductor switches QA and QB of the switching transformer Tr2 corresponding to the high-voltage lithium ion secondary battery C2 (T1<T2). In this example, since the amount of energy required to increase the voltages of the secondary battery C1 and the secondary battery C2 to the average value Vav is approximately two to one, the ratio of switching operation cycles T (T1:T2) is set to one to two. However, T1 T6.

By setting the ratio of the switching operation cycles T to one to two, the low-voltage secondary battery C1 has a shorter energy transfer cycle than the relatively high-voltage secondary battery C2, and receives a larger amount of energy from the common bus 50, thereby increasing the voltage further. Therefore, the voltage difference between the two secondary batteries C1 and C2 each having a voltage lower than the allowable range Y can be reduced while increasing the voltages of the two secondary batteries C1 and C2, and the voltages of the secondary batteries C1 to C6 can be efficiently equalized. Since the switching operation cycle T defines the energy transfer cycle, the switching operation cycle T corresponds to the "energy transfer cycle" of the present invention.

Figure 11:
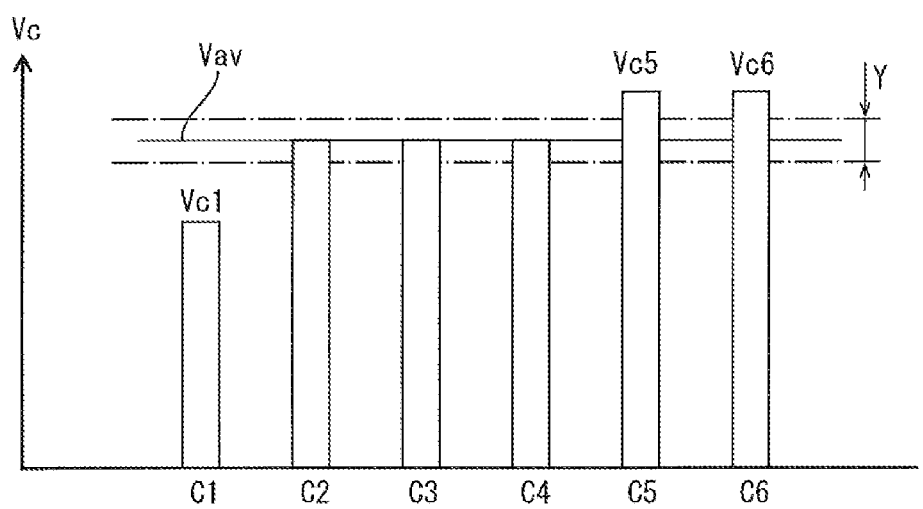
FIG. 11 is a diagram showing a variation in voltage of a secondary battery.

(4) A case where there are a plurality of secondary batteries C5 and C6 each having a voltage higher than the allowable range Y, there is no voltage difference between the high-voltage secondary batteries C5 and C6, and there is one low-voltage secondary battery C1 (in the case of FIG. 11, Vc5≈Vc6)

Figure 12:
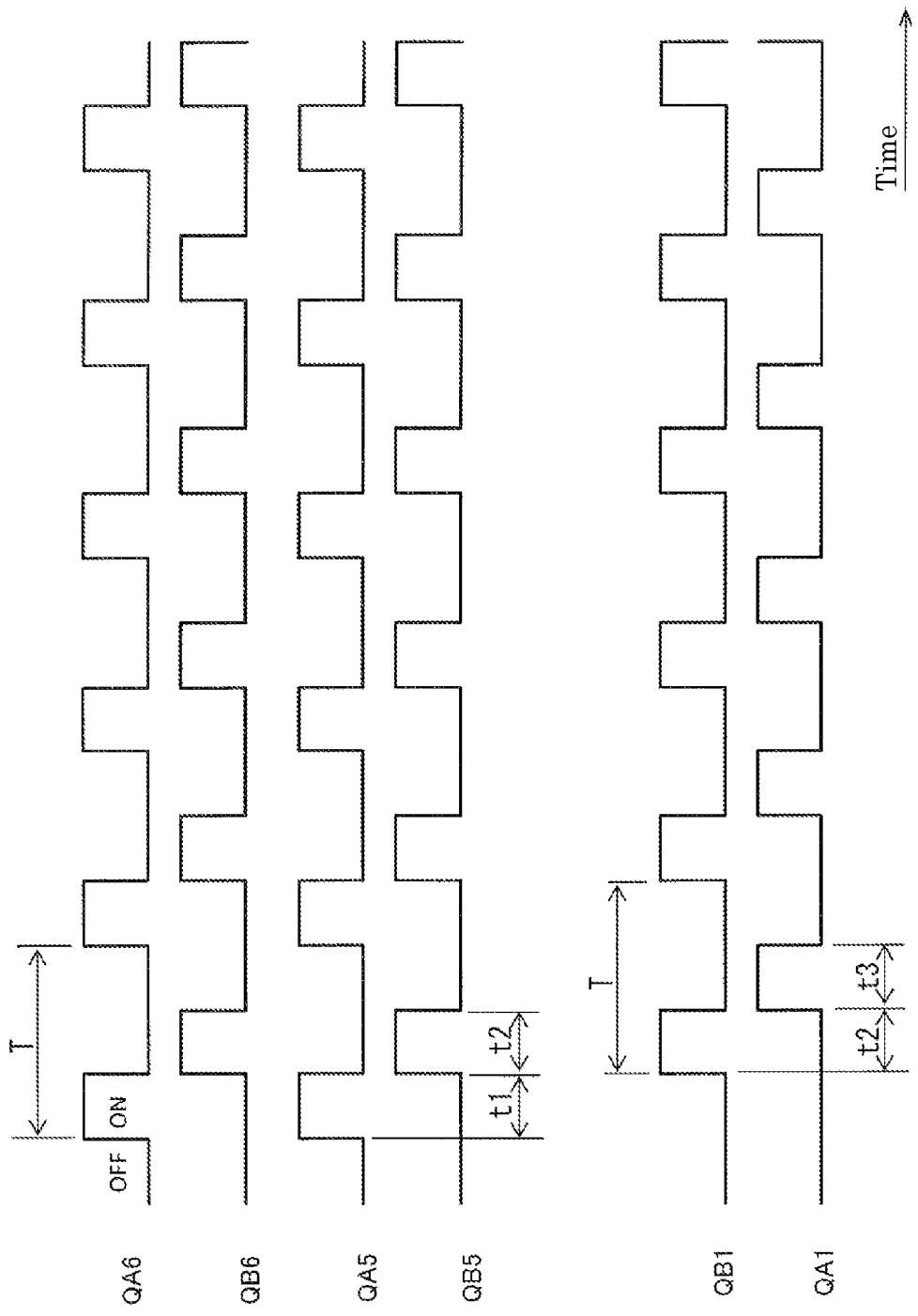
FIG. 12 is a timing chart showing ON/OFF of a semiconductor switch.

In this case, as shown in FIG. 12, the control device 70 simultaneously turns on the first semiconductor switch QA6 of the switching transformer Tr6 and the first semiconductor switch QA5 of the switching transformer Tr5 during the period t1, and simultaneously turns on the second semiconductor switch QB6 of the switching transformer Tr6 and the second semiconductor switch QB5 of the switching transformer Tr5 during the period t2. As a result, as shown in FIG. 13, energy can be transferred from the high-voltage secondary batteries C6 and C5 to the common bus 50 via the switching transformers Tr6 and Tr5.

Further, the control device 70 turns on the second semiconductor switch QB1 of the switching transformer Tr1 during the period t2, and turns on the first semiconductor switch QA1 of the switching transformer Tr1 during the period t3.

Figure 13:
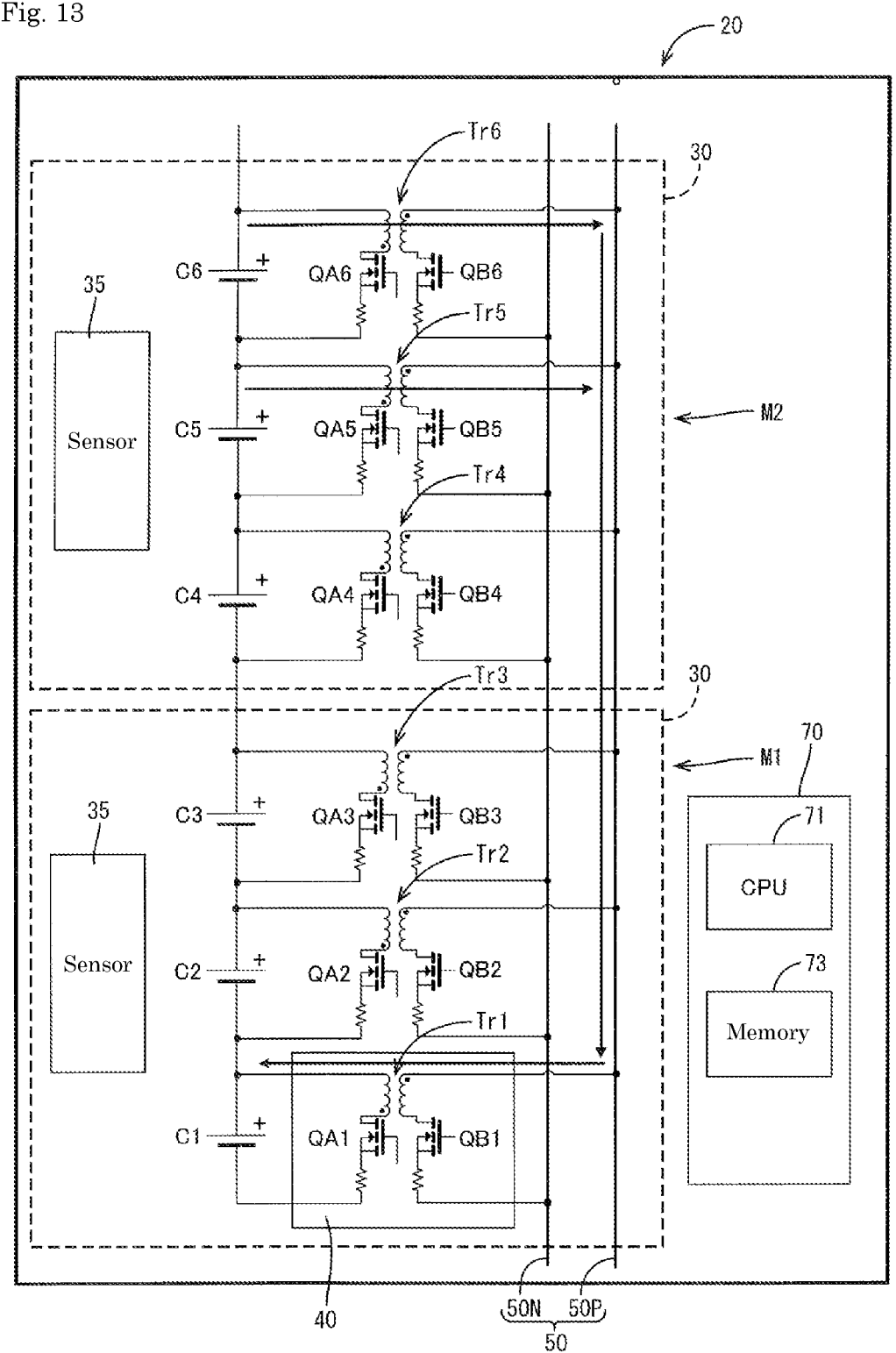
FIG. 13 is a diagram showing an energy transfer operation.

As a result, as shown in FIG. 13, energy can be transferred from the common bus 50 to the low-voltage secondary battery C1 via the switching transformer Tr1.

With this method, energy is simultaneously transferred from the plurality of high-voltage secondary batteries C5 and C6 to the common bus 50, so that there is an advantage that the time required for equalization is short.

Figure 14:
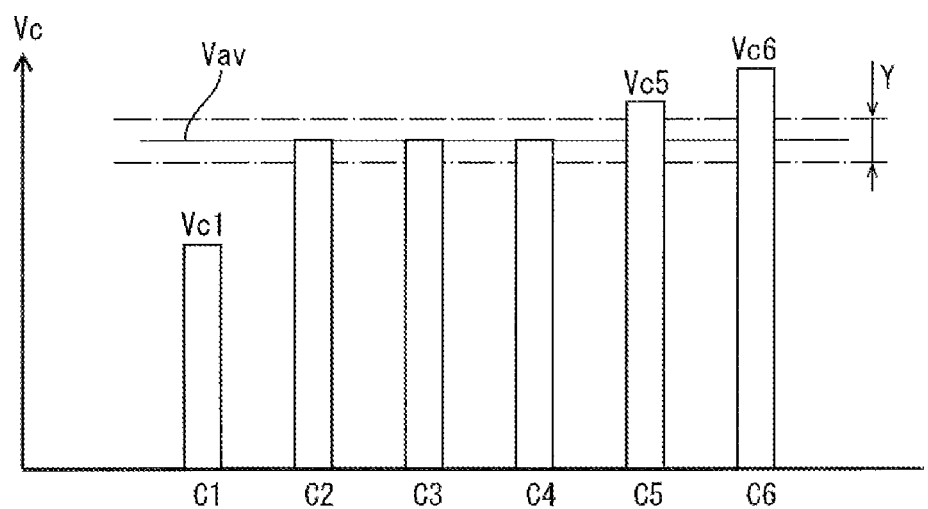
FIG. 14 is a view showing a variation in voltage of a secondary battery.

(5) A case where there are a plurality of secondary batteries C5 and C6 each having a voltage higher than the allowable range Y, there is a voltage difference between the high-voltage secondary batteries C5 and C6, and there is one low-voltage secondary battery C1 (in the case of FIG. 14, Vc5<Vc6)

Figure 15:
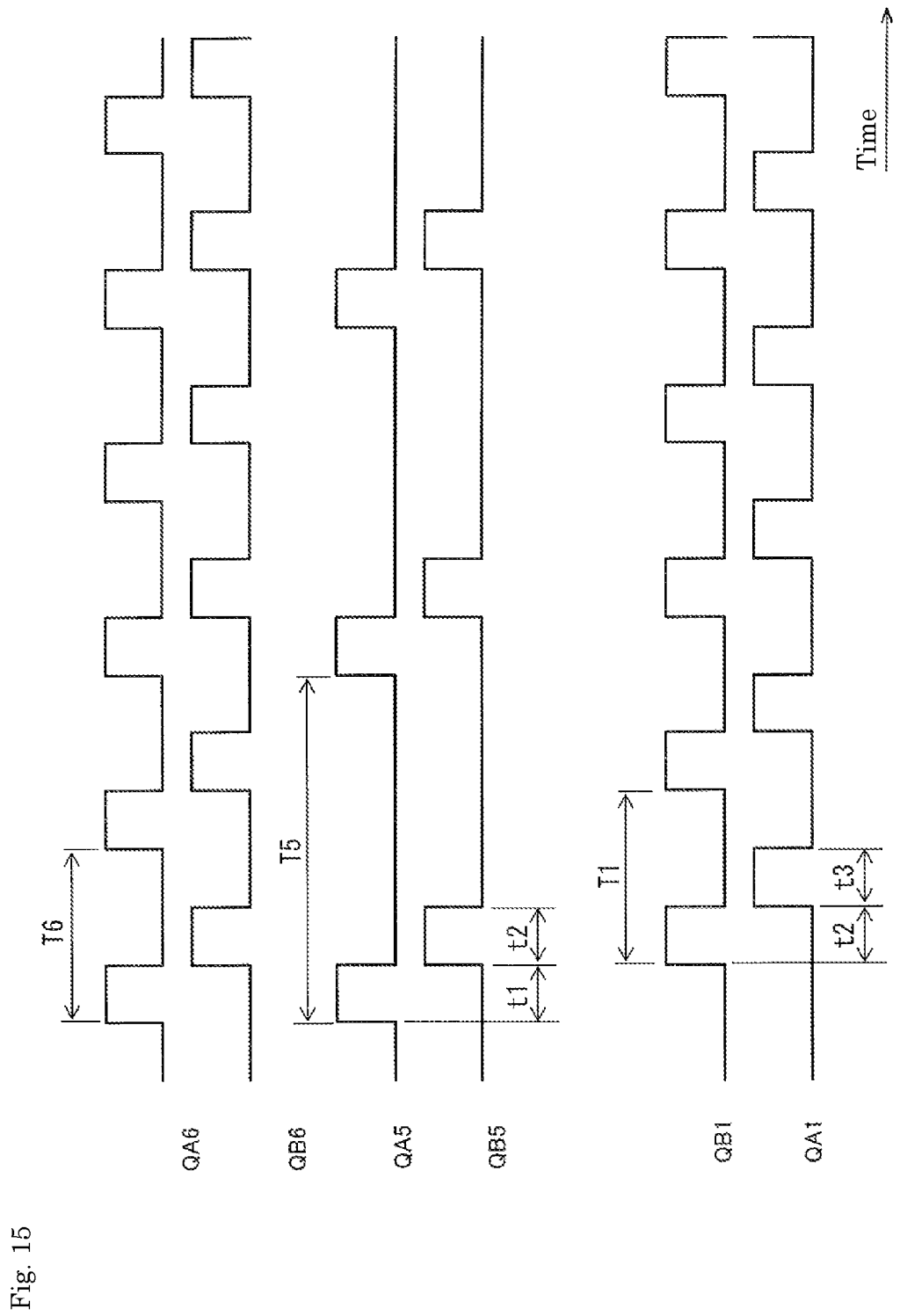
FIG. 15 is a timing chart showing ON/OFF of a semiconductor switch.

In this case, as shown in FIG. 15, the control device 70 changes the switching operation cycle T of the semiconductor switches QA and QB of the switching transformers Tr5 and Tr6 according to the voltage difference between the secondary batteries C5 and C6.

Specifically, of the two secondary batteries C5 and C6 each having a voltage higher than the allowable range Y, the switching operation cycle T6 of the semiconductor switches QA and QB of the switching transformer Tr6 corresponding to the high-voltage secondary battery C6 is made shorter than the switching operation cycle T5 of the semiconductor switches QA and QB of the switching transformer Tr5 corresponding to the low-voltage secondary battery C5 (T6<T5). In this example, since the amounts of energy reduction required to reduce the voltages of the secondary battery C6 and the secondary battery C5 to the average value Vav are approximately two to one, the ratio of the switching operation cycles T (T6:T5) is set to one to two. However, T1≈T6.

By setting the ratio of the switching operation cycles T (T6:T5) to one to two, the high-voltage secondary battery C6 has a shorter energy transfer cycle than the relatively low-voltage secondary battery C5, and transfers a larger amount of energy to the common bus 50, thereby reducing the voltage further. Therefore, the voltage difference between the two secondary batteries C5 and C6 each having a voltage higher than the allowable range Y can be reduced while reducing the voltages of the two secondary batteries C5 and C6, and the voltages of the secondary batteries C1 to C6 can be efficiently equalized.

4. Description of Effect

In this configuration, by using the switching transformer Tr of the energy transfer circuit 40 to transfer energy between the different battery modules M via the common bus 50, the voltages of the respective lithium ion secondary batteries C1 to C6 constituting the plurality of battery modules M1 and M2 can be equalized. Therefore, the energy of the maximum capacity can be used for the entire system including the plurality of battery modules M. Moreover, the common bus 50 is electrically floating. Therefore, the risk of electric shock or electric leakage is small during the connection work and the removal work of the battery module M. In addition, in the case of floating, the voltage is lower than when the common bus 50 is connected to the battery side, that is, when it is connected to both electrodes of the secondary batteries C1 to C6 connected in series. Therefore, the connection work and the removal work of the battery module M can be performed safely, and the extension work and the replacement work of the battery module M can be performed safely and easily.

In this configuration, when there are a plurality of secondary batteries C1 and C2 each having a voltage lower than the allowable range Y, the amount of energy received from the common bus 50 is controlled to be larger in the low-voltage secondary battery C1 than in the high-voltage secondary battery C2. Therefore, the voltage difference between the secondary batteries C1 and C2 each having a voltage lower than the allowable range Y can be reduced while increasing the voltages of the secondary batteries C1 and C2.

In this configuration, when there are a plurality of secondary batteries C5 and C6 each having a voltage higher than the allowable range Y, the amount of energy transferred to the common bus 50 is controlled to be larger in the high-voltage secondary battery C6 than in the low-voltage secondary battery C5. Therefore, the voltage difference between the secondary batteries C5 and C6 each having a voltage higher than the allowable range Y can be reduced while reducing the voltages of the secondary batteries C5 and C6.

The energy transfer circuit 40 of this configuration is a bidirectional transfer circuit, and energy can be transferred bidirectionally from the secondary battery C to the common bus 50 and from the common bus 50 to the secondary battery C with only one switching transformer Tr. Therefore, the number of components can be reduced.

Second Embodiment

Figure 16:
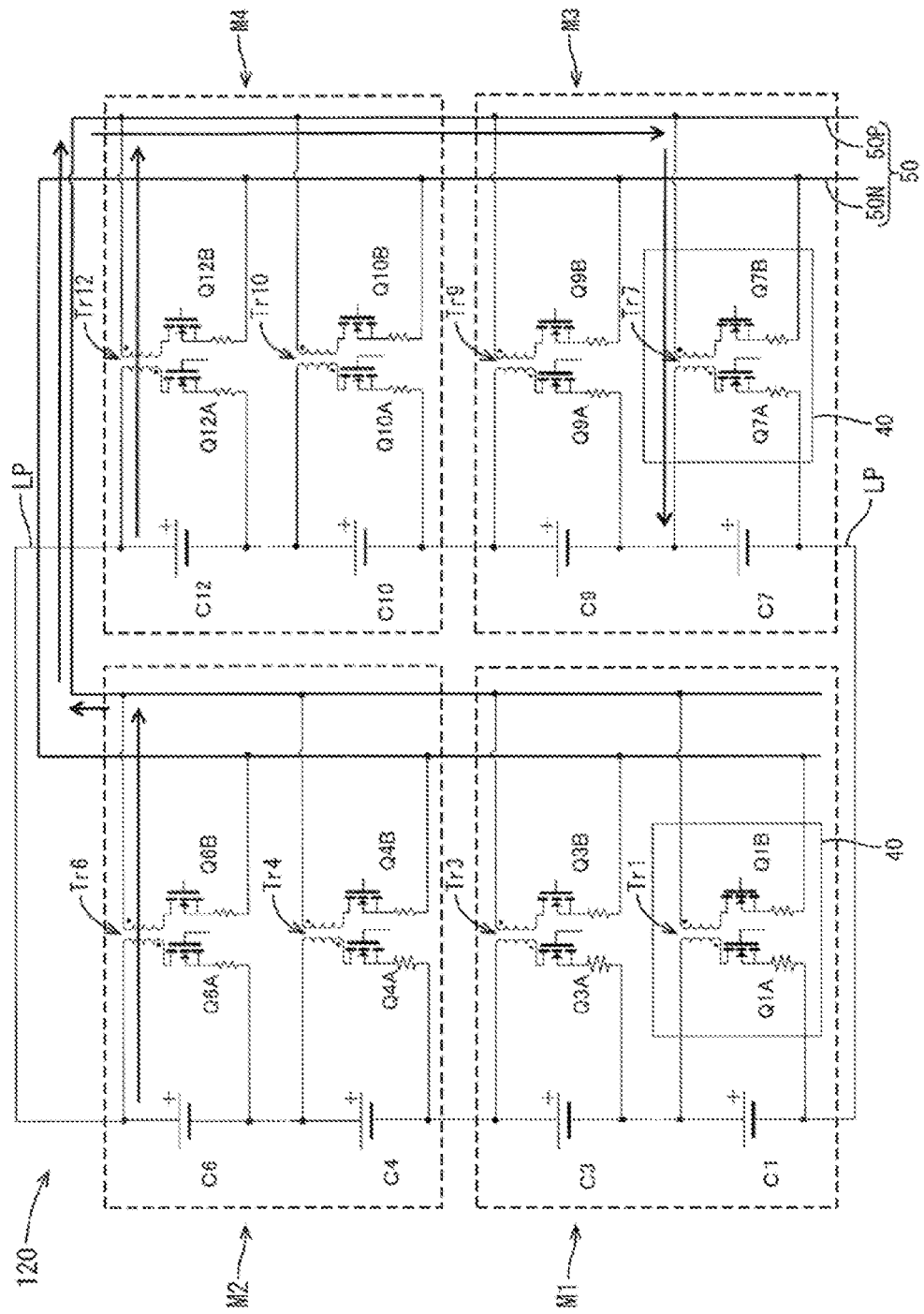
FIG. 16 is a circuit diagram showing an electric configuration of a battery according to a second embodiment.

The second embodiment will be described with reference to FIG. 16. As shown in FIG. 16, a battery 120 according to the second embodiment has four battery modules M1 to M4 and a common bus 50.

The battery modules M1 and M2 and the battery modules M3 and M4 are connected in series, respectively. In addition, parallel lines LP connect between the negative electrode of the secondary battery C1 of the battery module M1 and the negative electrode of the secondary battery C7 of the battery module M3 and between the positive electrode of the secondary battery C6 of the battery module M2 and the positive electrode of the secondary battery C12 of the battery module M4, respectively, and the battery modules M1 and M2 and the battery modules M3 and M4 are connected in parallel.

Each of the battery modules M1 to M4 includes an energy transfer circuit 40 corresponding to each of the secondary batteries C1 to C12.

The energy transfer circuit 40 includes a switching transformer Tr, a first semiconductor switch QA, and a second semiconductor switch QB, as in the first embodiment.

Each second winding 41B of the switching transformer Tr provided corresponding to each of the secondary batteries C1 to C6 of the battery modules M1 and M2 is connected to the common bus 50.

Each second winding 41B of the switching transformer Tr provided corresponding to each of the secondary batteries C7 to C12 of the battery modules M3 and M4 is connected to the common bus 50.

In the second embodiment, the second windings 41B of the switching transformers Tr1 to Tr12 of the energy transfer circuits 40 of the battery modules M1 to M4 connected in parallel are commonly connected to the common bus 50.

In this configuration, energy can be transferred between the battery modules connected in parallel via the common bus 50. Therefore, the voltages can be equalized not only between the battery modules connected in series but also between the battery modules connected in parallel.

In FIG. 16, energy is transferred to the common bus 50 from the secondary battery C6 of the battery module M2 having a voltage higher than the allowable range Y and the secondary battery C12 of the battery module M4 having a voltage higher than the allowable range Y by using the switching transformers Tr6 and Tr12. Then, the energy transferred to the common bus 50 is transferred to the lithium ion battery C7 of the battery module M3 having a voltage lower than the allowable range Y by using the switching transformer Tr7. Thereby, the voltages of the lithium ion batteries C1 to C12 constituting the battery modules M1 to M4 are equalized.

Other Embodiments

The present invention is not limited to the embodiments described above with reference to the above description and drawings. For example, the following embodiments are also included in the technical scope of the present invention.

(1) In the first and second embodiments, a lithium ion secondary battery is illustrated as an example of the "energy storage device". The energy storage device may be another secondary battery or an electric double layer capacitor. Further, the application of the battery 20 is not limited to a large mobile object such as a ship, and may be another application such as a UPS or an energy storage unit of a solar power generation system.

(2) In the first embodiment, the example of transferring energy between the battery modules has been described. However, the energy transfer may be performed not only between the battery modules but also within the battery module. For example, energy may be transferred via the common bus 50 between the secondary batteries C1 and C2 or between the secondary batteries C2 and C3 that constitute the battery module M1. The number of the secondary batteries C may be at least a plurality, and the presence or absence of modularization is not particularly limited.

Figure 17:
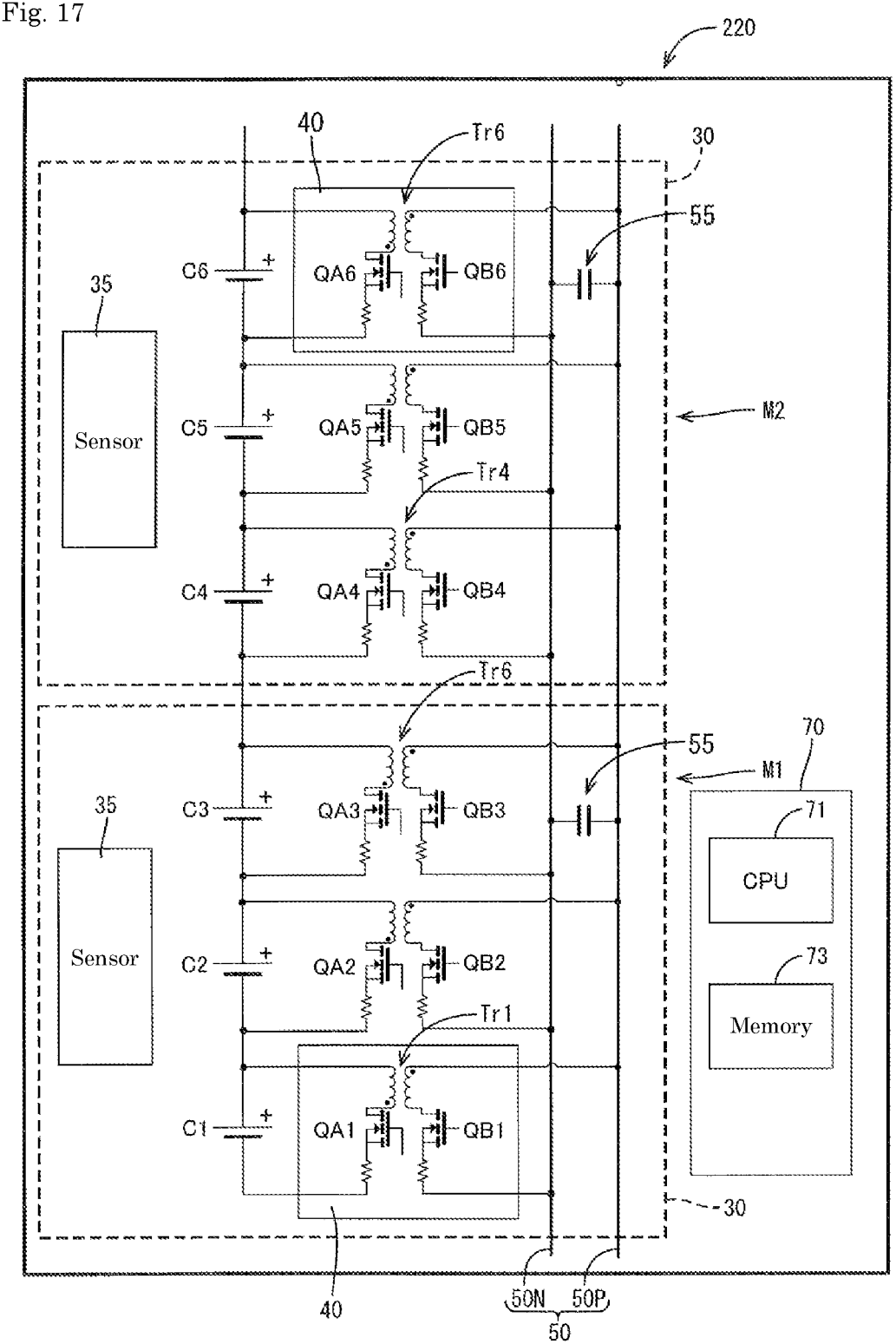
FIG. 17 is a circuit diagram showing an electric configuration of a battery according to another embodiment.

(3) In the first embodiment, as shown in FIG. 5, the timing of transferring energy from the switching transformer Tr6 to the common bus 50 (ON of QB6) and the timing of transferring energy from the common bus 50 to the switching transformer Tr1 (ON of QB1) are synchronized. In the case of a configuration in which the capacitor 55 is provided between the positive and negative bus bars 50P and 50N constituting the common bus 50 as in a battery 220 shown in FIG. 17, the timing of transferring energy from the switching transformer Tr6 to the common bus 50 (ON of QB6) and the timing of transferring energy from the common bus 50 to the switching transformer Tr1 (ON of QB1) may be asynchronous.

(4) In the first embodiment, as shown in FIG. 10, the amount of energy transferred from the secondary battery C to the common bus 50 is adjusted by changing the switching operation cycle T of the semiconductor switches QA and QB of the switching transformer Tr. Further, as shown in FIG. 15, the amount of energy to be transferred from the common bus 50 to the secondary battery C is adjusted. Adjustment of energy to be transferred may be performed by changing the length of the ON time (t1, t2, t3) of the semiconductor switches QA and QB, in addition to the method of changing the switching operation cycle T. Further, the semiconductor switches QA and QB are not limited to field-effect transistors, but may be bipolar transistors.

(5) In the first embodiment, as an example of the energy transfer circuit 40, a flyback type bidirectional transfer circuit is illustrated as shown in FIG. 2. The energy transfer circuit 40 may be any circuit that can transfer energy between the secondary battery C and the common bus 50, and is not limited to a bidirectional type. For example, as shown in FIG. 18, a first transfer circuit 310 for transferring energy from the secondary battery C1 to the common bus 50 and a second transfer circuit 320 for transferring energy from the common bus 50 to the secondary battery C1 may be configured to be connected in parallel.

Figure 18:
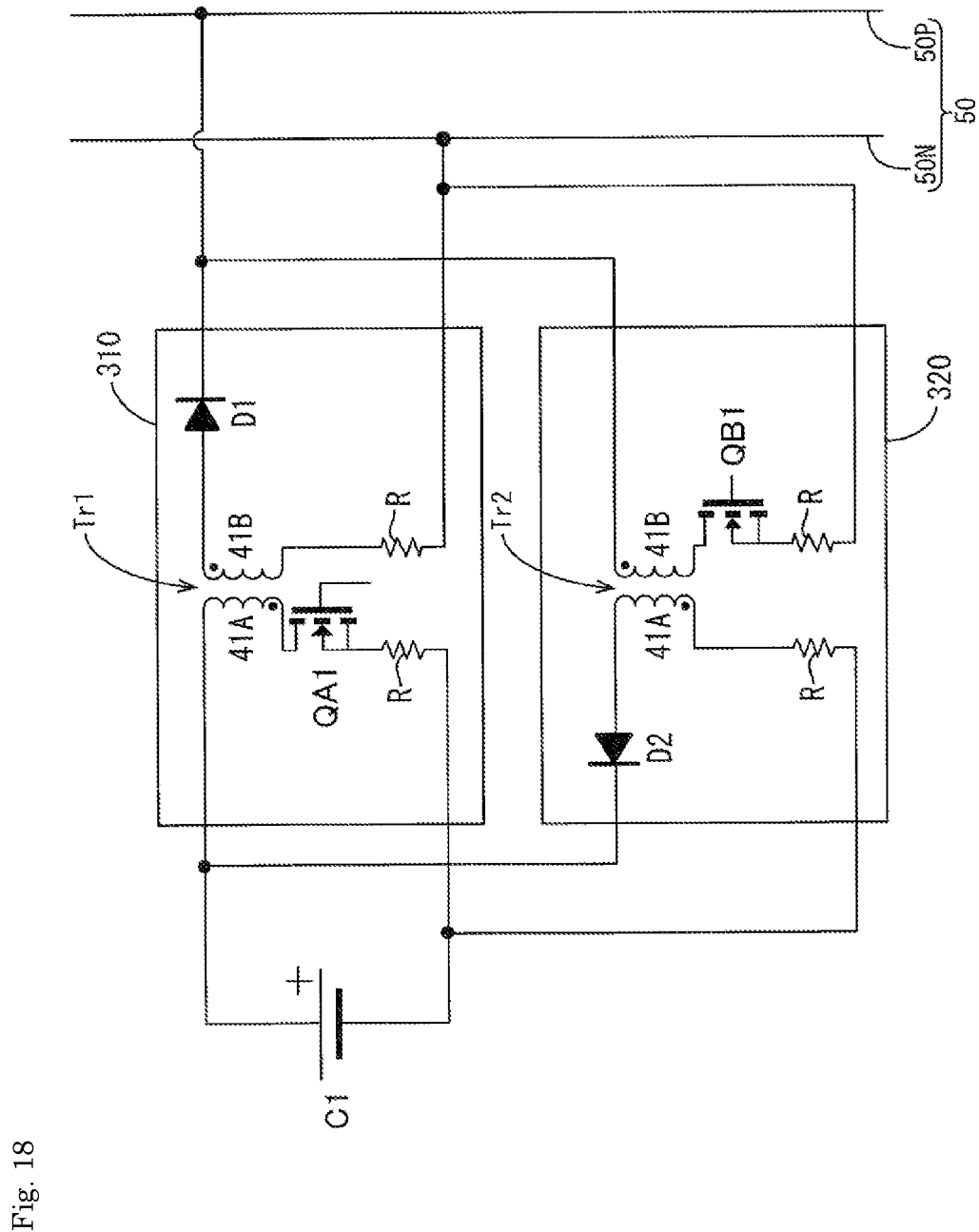
FIG. 18 is a circuit diagram of an energy transfer circuit according to another embodiment.

As shown in FIG. 18, the first transfer circuit 310 includes a first switching transformer Tr1, a first semiconductor switch QA1, resistors R, and a first diode D1. One end of the first winding 41A of the first switching transformer Tr1 is connected to the positive electrode of the secondary battery C1. The other end of the first winding 41A is connected to the negative electrode of the secondary battery C1 via the first semiconductor switch QA1 and the resistor R. Further, one end of the second winding 41B of the first switching transformer Tr1 is connected to the positive bus bar 50P constituting the common bus 50 via the first diode D1. The other end of the second winding 41B is connected via the resistor R to the negative bus bar 50N constituting the common bus 50. The first transfer circuit 310 can transfer energy from the secondary battery C1 to the common bus 50 by switching control of the first semiconductor switch QA1.

As shown in FIG. 18, the second transfer circuit 320 includes a second switching transformer Tr2, a second semiconductor switch QB1, resistors R, and a second diode D2. One end of the first winding 41A of the second switching transformer Tr2 is connected to the positive electrode of the secondary battery C1 via the second diode D2. The other end of the first winding 41A is connected via the resistor R to the negative electrode of the secondary battery C1. Further, one end of the second winding 41B of the second switching transformer Tr2 is connected to the positive bus bar 50P constituting the common bus 50. The other end of the second winding 41B is connected to the negative bus bar 50N constituting the common bus 50 via the second semiconductor switch QB1 and the resistor R. The second transfer circuit 320 can transfer energy from the common bus 50 to the secondary battery C1 by switching control of the second semiconductor switch QB1.

The energy transfer circuit 40 is not limited to the flyback type, but may be a forward type.

DESCRIPTION OF REFERENCE SIGNS

20: . . . Battery (an example of the "energy storage apparatus" of the present invention)
30: . . . Case
40: . . . Energy transfer circuit
41A: . . . First winding
41B: . . . Second winding
50: . . . Common bus
70: . . . Control device
C: . . . Secondary battery (an example of the "energy storage device" of the present invention)
M: . . . Battery module (an example of the "energy storage device module" of the present invention)
QA: . . . First semiconductor switch (an example of the "first switch" of the present invention)
QB: . . . Second semiconductor switch (an example of the "second switch" of the present invention)
Tr: . . . Switching transformer
T: . . . Switching operation cycle (an example of the "energy transfer cycle" of the present invention)

The invention claimed is:

1. An energy storage apparatus, comprising:
a plurality of energy storage devices connected in series;
an energy transfer circuit provided for each of the plurality of energy storage devices;
a common bus in which the energy transfer circuits of the plurality of energy storage devices are connected in common; and
a control device,
wherein:
the energy transfer circuit includes one or more switching transformers each having a first winding connected to the energy storage device and a second winding connected to the common bus, the control device equalizes voltages of the energy storage devices by transferring energy between the energy storage devices via the common bus by using the energy transfer circuits, and the common bus is electrically floating and connected to only the second winding of each of the one or more switching transformers of the energy transfer circuit.

2. The energy storage apparatus according to claim 1, wherein:

the energy storage apparatus further comprises a plurality of energy storage device modules connected in series or in parallel, each of the energy storage device modules includes the plurality of energy storage devices connected in series, the energy transfer circuits provided in the respective energy storage devices of the energy storage device modules connected in series or in parallel are connected to the common bus, respectively, and the control device equalizes voltages of the energy storage devices between the energy storage device modules by transferring energy between the energy storage device modules via the common bus by using the energy transfer circuits.

3. The energy storage apparatus according to claim 1, wherein the energy transfer circuit comprises:

the switching transformer;

a first switch provided on the first winding of the switching transformer; and a second switch provided on the second winding of the switching transformer.

4. The energy storage apparatus according to claim 1, wherein the control device, in a case where it compares voltages of the plurality of energy storage devices with an allowable range of voltage variation, and there are a plurality of energy storage devices each having a voltage higher than the allowable range, allows an energy storage device having a higher voltage to transfer a larger amount of energy to the common bus than an energy storage device having a lower voltage, among the plurality of energy storage devices each having a voltage higher than the allowable range.

5. The energy storage apparatus according to claim 4, wherein the control device adjusts an amount of energy transferred from the energy storage device to the common bus or an amount of energy received by the energy storage device from the common bus by changing an energy transfer cycle of the energy transfer circuit.

6. The energy storage apparatus according to claim 1, wherein the control device, in a case where it compares voltages of the plurality of energy storage devices with an allowable range of voltage variation, and there are a plurality of energy storage devices each having a voltage lower than the allowable range, allows an energy storage device having a lower voltage to receive a larger amount of energy from the common bus than an energy storage device having a higher voltage, among the plurality of energy storage devices each having a voltage lower than the allowable range.

7. The energy storage apparatus according to claim 6, wherein the control device adjusts an amount of energy transferred from the energy storage device to the common bus or an amount of energy received by the energy storage device from the common bus by changing an energy transfer cycle of the energy transfer circuit.

8. An energy storage apparatus, comprising:

a plurality of energy storage devices connected in series;

an energy transfer circuit provided for each of the plurality of energy storage devices;

a common bus in which the energy transfer circuits of the plurality of energy storage devices are connected in common; and a control device, wherein:

the energy transfer circuit includes one or more switching transformers each having a first winding connected to the energy storage device and a second winding connected to the common bus, the control device equalizes voltages of the energy storage devices by transferring energy between the energy storage devices via the common bus by using the energy transfer circuits, the common bus is electrically floating, and the energy transfer circuit comprises: the switching transformer; a first switch provided on the first winding of the switching transformer; and a second switch provided on the second winding of the switching transformer.

9. The energy storage apparatus according to claim 8, wherein:

the energy storage apparatus further comprises a plurality of energy storage device modules connected in series or in parallel, each of the energy storage device modules includes the plurality of energy storage devices connected in series, the energy transfer circuits provided in the respective energy storage devices of the energy storage device modules connected in series or in parallel are connected to the common bus, respectively, and the control device equalizes voltages of the energy storage devices between the energy storage device modules by transferring energy between the energy storage device modules via the common bus by using the energy transfer circuits.

10. An energy storage apparatus, comprising:

a plurality of energy storage devices connected in series;

an energy transfer circuit provided for each of the plurality of energy storage devices;

a common bus in which the energy transfer circuits of the plurality of energy storage devices are connected in common; and a control device, wherein:

the energy transfer circuit includes one or more switching transformers each having a first winding connected to the energy storage device and a second winding connected to the common bus, the control device equalizes voltages of the energy storage devices by transferring energy between the energy storage devices via the common bus by using the energy transfer circuits, the common bus is electrically floating, and either:

the control device, in a case where it compares voltages of the plurality of energy storage devices with an allowable range of voltage variation, and there are a plurality of energy storage devices each having a voltage higher than the allowable range, allows an energy storage device having a higher voltage to transfer a larger amount of energy to the common bus than an energy storage device having a lower voltage, among the plurality of energy storage devices each having a voltage higher than the allowable range; or the control device, in a case where it compares voltages of the plurality of energy storage devices with an allowable range of voltage variation, and there are a plurality of energy storage devices each having a voltage lower than the allowable range, allows an energy storage device having a lower voltage to receive a larger amount of energy from the common bus than an energy storage device having a higher voltage, among the plurality of energy storage devices each having a voltage lower than the allowable range.

11. The energy storage apparatus according to claim 10, wherein:
   the energy storage apparatus further comprises a plurality of energy storage device modules connected in series or in parallel,
   each of the energy storage device modules includes the plurality of energy storage devices connected in series,
   the energy transfer circuits provided in the respective energy storage devices of the energy storage device modules connected in series or in parallel are connected to the common bus, respectively, and
   the control device equalizes voltages of the energy storage devices between the energy storage device modules by transferring energy between the energy storage device modules via the common bus by using the energy transfer circuits.

* * * * *